United States Patent
Criado et al.

(10) Patent No.: US 9,708,077 B2
(45) Date of Patent: Jul. 18, 2017

(54) UAV TAKE-OFF METHOD AND APPARATUS

(71) Applicant: The Boeing Company, Chicago, IL (US)

(72) Inventors: Alfredo Criado, Barcelona (ES); Grzegorz M. Kawiecki, Madrid (ES); Jose L. Lemus Martin, Madrid (ES); Eduardo G. Ferreyra, Madrid (ES); Sergio Pereira Mayan, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/610,847

(22) Filed: Jan. 30, 2015

(65) Prior Publication Data

US 2016/0083112 A1    Mar. 24, 2016

(30) Foreign Application Priority Data

Jan. 30, 2014   (EP) .................................. 14382030

(51) Int. Cl.
  *B64F 1/08*   (2006.01)
  *B64F 1/10*   (2006.01)
  *B64C 39/02*  (2006.01)

(52) U.S. Cl.
  CPC .............. *B64F 1/08* (2013.01); *B64C 39/024* (2013.01); *B64F 1/10* (2013.01); *B64C 2201/08* (2013.01)

(58) Field of Classification Search
  CPC ...... B64F 1/04; B64F 1/08; B64F 1/10; B64C 2201/08
  See application file for complete search history.

(56) References Cited

U.S. PATENT DOCUMENTS

| | | | | | |
|---|---|---|---|---|---|
| 1,415,847 | A | * | 5/1922 | Sperry | ...................... B64F 1/06 |
| | | | | | 244/63 |
| 2,135,033 | A | * | 11/1938 | Courtney | .................. B64F 1/10 |
| | | | | | 244/63 |

(Continued)

FOREIGN PATENT DOCUMENTS

| | | |
|---|---|---|
| DE | 9306655 U1 | 8/1993 |
| WO | 2012025653 A1 | 3/2012 |

OTHER PUBLICATIONS

Anonymous: "Dolly—RC Groups", Jul. 30, 2007, XP055134473, Retrieved from the Internet: URL: http://www.rcgroups.com/forums/showthread.php?t=720243 [retrieved on Aug. 12, 2014].

(Continued)

*Primary Examiner* — Tien Dinh
*Assistant Examiner* — Richard R Green
(74) *Attorney, Agent, or Firm* — Miller, Matthias & Hull LLP (57) ABSTRACT

A method and apparatus for launching unmanned air vehicles (UAVs) includes supporting the unmanned air vehicle on a surface vehicle, such as a dolly cart, for riding along a surface such as ground or water. A towline is connected to the surface vehicle and the towline is pulled to force the unmanned air vehicle in a forward direction at a speed sufficient for take-off. The towline may be pulled by a winch system. In some embodiments the UAV is positioned with a nose down angle on the surface vehicle. The nose down angle permits overspeed of the UAV and cart as it is pulled along the ground, as well as controlled take-off.

20 Claims, 8 Drawing Sheets

(56) References Cited

U.S. PATENT DOCUMENTS

| | | | | |
|---|---|---|---|---|
| 2,234,751 A * | 3/1941 | Fleet | .......................... | B64F 1/10 |
| | | | | 244/63 |
| 2,390,677 A * | 12/1945 | Alkan et al. | .............. | B64F 1/06 |
| | | | | 244/14 |
| 3,163,380 A * | 12/1964 | Brodie | ...................... | B64F 1/04 |
| | | | | 188/62 |
| 7,165,745 B2 * | 1/2007 | McGeer | .................... | B64F 1/06 |
| | | | | 244/63 |
| 2015/0060600 A1 * | 3/2015 | Tully | ........................ | B64F 1/08 |
| | | | | 244/63 |

OTHER PUBLICATIONS

"Topmodel CZ—Sailplane Take-off Dolly II", Aug. 12, 2014, XP0055134501, Retrieved from the Internet: URL: http://www.topmodelcz.cz./index.php? &desktop_back=eshop&action_back=&id_back=&desktop=eshop&action=zbozi_detail&id_18028[retrieved on Aug. 13, 2014].

European Search Report application No. EP 14382030.5 dated Aug. 22, 2014.

* cited by examiner

UAV TAKE-OFF METHOD AND APPARATUS

FIELD OF THE DISCLOSURE

The present disclosure generally relates to a method and apparatus for launching unmanned air vehicles (UAVs).

BACKGROUND OF THE DISCLOSURE

UAVs are commonly launched from the ground in a manner similar to manned aircraft. For example, for fixed wing UAVs this is in many cases by travelling along the ground powered by an energy source carried by the UAV itself until the vehicle reaches sufficient speed for take-off. For example, the UAV may be powered by a battery to drive a propeller. The UAV is driven along a runway-like surface until it reaches take-off speed at which point lift control surfaces are adjusted to increase the lift and cause the aircraft to take-off.

An alternative approach uses a catapult or rail guided system. In this system, the UAV is driven forward by an elastic or spring mechanism, and the direction of motion is guided by a rail along which the aircraft travels. The rail may be at an angle to horizontal to launch the UAV directly into the air. Catapult systems are generally designed for each specific model or type of UAV.

Figure 1A:
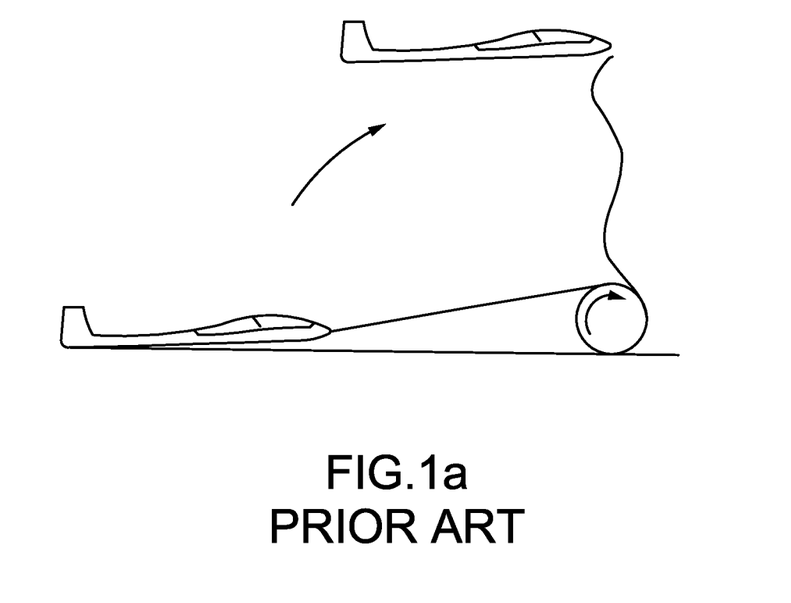
FIGS. 1a and 1b are diagrams illustrating conventional techniques of launching UAVs or manned and unmanned sailplanes/gliders.
Figure 1B:
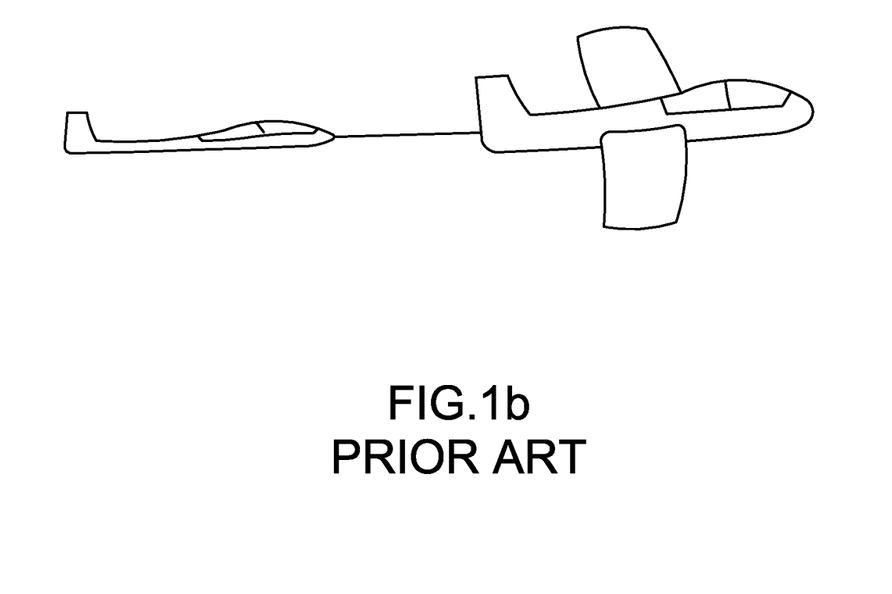

Other techniques for launching UAVs are also known. FIGS. 1a and 1b show towing systems. FIG. 1a is a winch towing system for gliders (also known as sailplanes). Such towing systems may be used for manned or unmanned gliders. The towline is connected to the aircraft and wound around the winch. As the winch winds in the towline the aircraft is pulled forward at increasing speed. When the aircraft reaches a sufficiently high velocity it is able to take-off.

Other catapult and launch systems use an elastic towline such as a bungee cord coupled to the UAV.

FIG. 1b shows a towing system often used for manned glider or sailplane launch in which a powered aircraft tows the glider. When the glider and powered aircraft reach a desired altitude the towline between the glider and aircraft is released.

SUMMARY OF THE DISCLOSURE

According to certain aspects of the present disclosure, a method of launching an unmanned air vehicle is provided that includes: supporting the unmanned air vehicle on a launch vehicle, namely a land based vehicle or water based surface vehicle for riding or travelling along the ground or across water; connecting a towline to the surface vehicle; and pulling the towline to force the unmanned air vehicle in a forward direction at a speed sufficient for take-off. The towline is driven to pull the surface vehicle from rest to a launch speed for the unmanned air vehicle to take-off. The unmanned air vehicle may be a fixed wing air vehicle, that is, one in which the body of the wing is fixed relative to the fuselage. The advantage of this launch method is that the unmanned air vehicle does not use its own energy source to propel it to take-off speed and after take-off the surface vehicle remains on the ground such that the unmanned air vehicle does not carry heavy or drag inducing wheels or landing gear in flight. Also in this method no bulky guide systems such as a catapult or rail are needed. The surface vehicle may also be adapted for use with more than one type of unmanned air vehicle.

As mentioned, the launch vehicle may be a surface vehicle for travelling across the surface of the land or water. The launch vehicle may be a land based vehicle. By land based vehicle we mean a vehicle that is intended for use on the ground or other solid surfaces such as frozen lakes.

In these arrangements the loads from the towline are transmitted to the surface vehicle rather than directly to the unmanned air vehicle eliminating the need for a coupling to the UAV and any associated reinforcement at the fixing point of the coupling. The tension in the towline comes from the winch system and not from a bungee cord as in some prior art systems. The removal of the bungee cord in providing the towline driving tension means the tension can be applied on-demand when required, and reduces personal or material risks related to unintended bungee release.

The step of supporting may comprise supporting the unmanned air vehicle in a nose down position such that the forward motion of the unmanned air vehicle with the surface vehicle is with the nose down. By nose down we mean that the fuselage axis is sufficiently inclined with respect to the incoming airstream to generate a negative lifting force at lifting surfaces. The "nose down" attitude is sufficient to develop an aerodynamic force on the wing which is directed downwards instead of upwards. The downward force prevents the unmanned air vehicle from lifting off from the dolly prematurely. The magnitude of the lifting force depends on the angle of attack (the angle between the incoming air velocity vector and airfoil chord) of the unmanned air vehicle. For airfoils used in UAVs, positive lifting force may be developed for angles of attack as low as −4 degrees. The wing may be fixed to the fuselage in most cases at an angle in the range 6 to 8 degrees, or even in the wider range of 2 to 12 degrees, depending on design requirements. The result is that in some instances even if the fuselage is quite "nose down", the actual angle of attack may be still in the range of providing positive lifting force. The nose down position may have sufficient incline to provide negative lift at the lift surfaces of the unmanned air vehicle as the unmanned air vehicle moves in a forward direction. During the step of supporting, the angle of attack of the unmanned air vehicle on the surface vehicle may be negative so as to provide negative lift at lift surfaces of the unmanned air vehicle.

The nose down position, or negative lift position, has the advantage of being able to permit drive of the unmanned air vehicle forward at speeds greater than the minimum take-off speed for the unmanned air vehicle. This overspeed permits rapid launch when the unmanned air vehicle is released from the land based vehicle. The nose down position depends on aircraft geometry and take-off procedure requirements. In some embodiments the nose down angle may be between 5 and 20 degrees, or between 10 and 20 degrees, such as at 15 degrees.

The method may further comprise controlling the lift surfaces of the unmanned air vehicle and adjusting the lift surfaces to launch the unmanned air vehicle when the speed of the surface vehicle or land based vehicle is sufficient for take-off of the unmanned air vehicle. Adjusting the lift surfaces allows the timing of take-off to be controlled. Adjustment of the lift surfaces to initiate take-off may occur if the unmanned air vehicle is nose down or even if the unmanned air vehicle is not nose down on the land based vehicle. The adjustment of the lift surfaces may increase lift provided by the wings to launch the unmanned air vehicle.

At least a part of the towline may be resilient to reduce the impact of initial towline tension, such as when the towline is initially pulled so that the towline is taut, and/or the towline is pulled to initiate motion of the launch vehicle to which it is connected. The resilience may be provided by a section of the towline which includes elasticity. The resilient section smoothens the increase in speed of the launch vehicle. The reduction of impact on the launch vehicle is advantageous because impacts to the launch vehicle may jolt or shake the unmanned air vehicle changing its position on the launch vehicle or causing it to become unstable on, or fall from, the launch vehicle. The elasticity also reduces the impact on the towline of the launch vehicle's static inertia as the towline is pulled taut and motion of the launch vehicle is initiated. This elasticity reduces the occurrence of breakage of the towline and prolongs the life of the towline.

If the launch vehicle is a land based vehicle it may be a dolly cart or trolley having wheels or sleds or any suitable vehicle for riding over ground. In some applications wheels are advantageous, however sleds or, e.g., a device providing an air cushion may alternatively be used. Other types of launch vehicles may be used across the surface of water or other terrain. For example, a vehicle having an air cushion such as based on a hovercraft may be used for mixed terrain or if riding over ice or frozen ground.

The unmanned air vehicle may be retained on the surface vehicle during initial towline tension impact by retainers on the surface vehicle arranged to contact trailing edges of the wings of the unmanned air vehicle and prevent rearward movement of the unmanned air vehicle relative to the surface vehicle. The retainers may prevent unwanted movement of the unmanned air vehicle which might prematurely dislodge the unmanned air vehicle from the surface vehicle or become unstable on, or fall from, the surface vehicle. This might also occur during initial towline tension, or when riding over bumps or lumps along the ground.

The unmanned air vehicle may be supported on the surface vehicle by the wings of the unmanned air vehicle resting on side walls of the surface vehicle.

The step of supporting may comprise supporting the fuselage of the unmanned air vehicle between two sidewalls of the surface vehicle. Other ways of supporting the unmanned air vehicle on the surface vehicle are possible, but the methods mentioned here have been found particularly suitable for the types of unmanned air vehicle tested.

The sidewalls may comprise vertical slides and the unmanned air vehicle may comprise a pair of laterally opposed guides at the sides of the fuselage, the slides obstructing rearward motion of the guides relative to the surface vehicle. The guides and slides may be configured such that at take-off the guides slide upwards against the slides, guiding the upward motion of the unmanned air vehicle such as until it is clear of the surface vehicle. The slides may be ridges or channels that are linear and arranged vertical or close to the vertical. The guides may be protrusions, pins or ridges extending from the fuselage of the unmanned air vehicle.

The step of pulling the towline may comprise driving or winding a winch to pull the towline.

Conventional UAVs can be launched using the methods of the present disclosure as no or little modification is required to the UAV airframe. The airframe also does not receive directly the point-force associated with the towline as this is received by the surface vehicle.

Also disclosed herein is an apparatus for launching an unmanned air vehicle, comprising: a towline; a surface vehicle adapted to travel or ride along the ground or across the surface of water, the surface vehicle adapted such that the unmanned air vehicle rests on the surface vehicle, the surface vehicle having a coupling for connecting the towline to the surface vehicle; and drive means for pulling the towline to pull the surface vehicle.

The surface vehicle may have supports arranged to support the unmanned air vehicle in a nose down position as the surface vehicle travels along the ground or across water.

The surface vehicle may be a land based vehicle such as a dolly cart having wheels or sleds or any other device for riding over ground.

The drive means may comprise a winch for winding the towline and pulling the surface vehicle along the ground.

A further advantage is that the costs for the systems and methods described herein are significantly less than for conventional UAV launch systems. Estimates suggest the cost is 10-13% of that of a conventional launch system.

According to certain aspects of the present disclosure, a method of launching an unmanned air vehicle may include supporting the unmanned air vehicle on a land or water based surface vehicle for riding along the ground or across water; connecting a towline to the surface vehicle; and pulling the towline to force the unmanned air vehicle in a forward direction at a speed sufficient for take-off. The step of supporting may include supporting the unmanned air vehicle in a nose down position such that the forward motion of the unmanned air vehicle with the surface vehicle is with the nose down. The nose down position may have sufficient incline to provide negative lift at the lift surfaces of the unmanned air vehicle as the unmanned air vehicle moves in a forward direction. During the step of supporting, the angle of attack of the unmanned air vehicle on the surface vehicle is negative so as to provide negative lift at lift surfaces of the unmanned air vehicle. The method may also include controlling the lift surfaces of the unmanned air vehicle and adjusting the lift surfaces to launch the unmanned air vehicle when the speed of the surface vehicle is sufficient for take-off of the unmanned air vehicle. At least a part of the towline may be resilient to reduce the impact of initial towline tension. The surface vehicle may be a dolly cart having wheels, sleds or other device for riding over ground or across water. The unmanned air vehicle may be retained on the surface vehicle during initial towline tension impact by retainers on the surface vehicle arranged to contact trailing edges of the wings of the unmanned air vehicle and prevent rearward movement of the unmanned air vehicle relative to the surface vehicle. The unmanned air vehicle may be supported on the surface vehicle by the wings of the unmanned air vehicle resting on side walls of the surface vehicle. The step of supporting may include supporting the fuselage of the unmanned air vehicle between two sidewalls of the surface vehicle. The sidewalls may include vertical slides and the unmanned air vehicle comprises a pair of laterally opposed guides at the sides of the fuselage, the slides obstructing rearward motion of the guides relative to the surface vehicle. The step of pulling the towline comprises driving a winch to pull the towline. The method may also include turning on propeller or other propulsion apparatus of the unmanned air vehicle after take-off from the surface vehicle.

In some embodiments, an apparatus for launching an unmanned air vehicle is provided that may include a towline; a surface vehicle adapted to travel along the ground or across water, the surface vehicle adapted such that the unmanned air vehicle rests on the surface vehicle, the surface vehicle having a coupling for connecting the towline to the surface vehicle; and drive apparatus for pulling the towline to pull the surface vehicle. The surface vehicle may have supports arranged to support the unmanned air vehicle in a nose down position as the surface vehicle travels along the ground or across water. The supports may be arranged to support the unmanned air vehicle at a negative angle of attack so as to provide negative lift at lift surfaces of the unmanned air vehicle. The surface vehicle may be a dolly cart having wheels, sleds or other device for riding over ground or across water. The drive apparatus may include a winch.

An additional advantage is that because launch does not use, or uses significantly less, energy from the internal energy source of the UAV, the flight time of the UAV can be extended. Alternatively instead of increased flying time the battery (or other energy source) size and weight could be reduced. However, increased flying times tend to be most beneficial because this increases revenue, and decreases the number of take-off and landings which are phases of flight having inherent risks.

BRIEF DESCRIPTION OF THE DRAWINGS

Embodiments of the present disclosure, along with aspects of the prior art, will now be described with reference to the accompanying drawings, of which.

DETAILED DESCRIPTION

Figure 2:
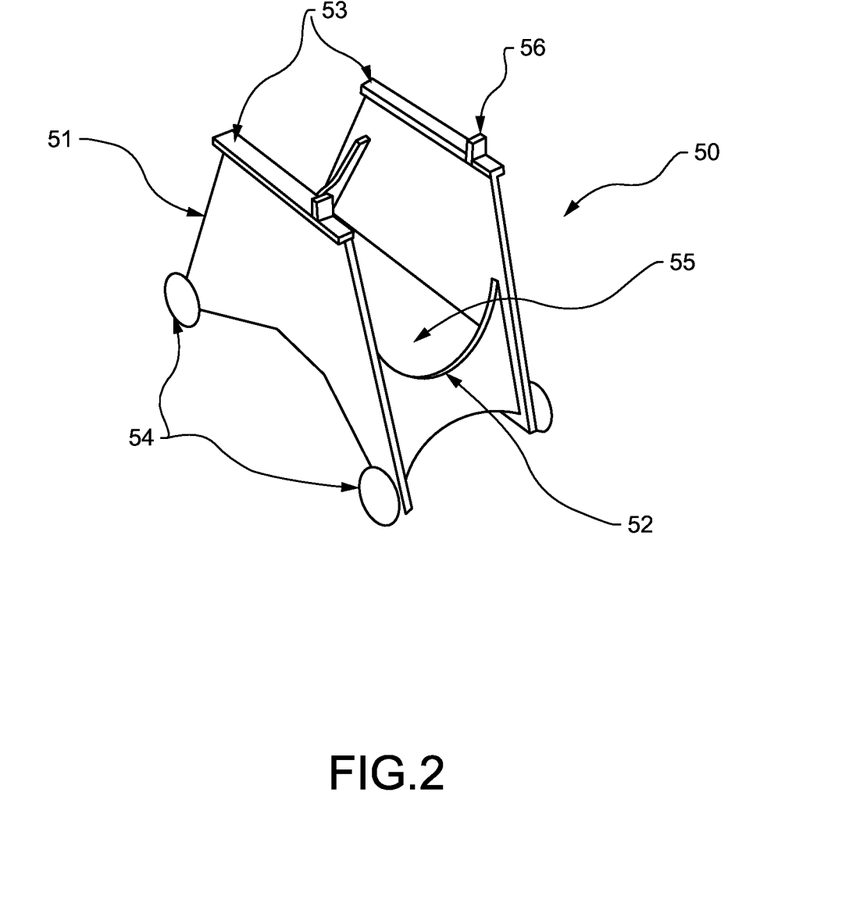
FIG. 2 is a perspective view of a land based vehicle from which to launch an unmanned air vehicle.

FIG. 2 shows a dolly cart 50 for travelling along the ground. The cart 50 is adapted for use with a method of launching an unmanned air vehicle according to the present disclosure. The steps of the method are as set out in FIG. 3. Further features of the method and cart are shown in FIGS. 4 to 8. In alternative embodiments the launch vehicle may have sleds or skis for travelling over snow or ice, may be based on a hover vehicle having an air cushion for travelling across land and water, or may be adapted for use on water alone. The type of launch vehicle will likely be selected based on the terrain over which the UAV will travel for take-off. Whichever type of launch vehicle is used the launch vehicle will travel across the surface of the land, water, ice, snow etc.

Figure 3:
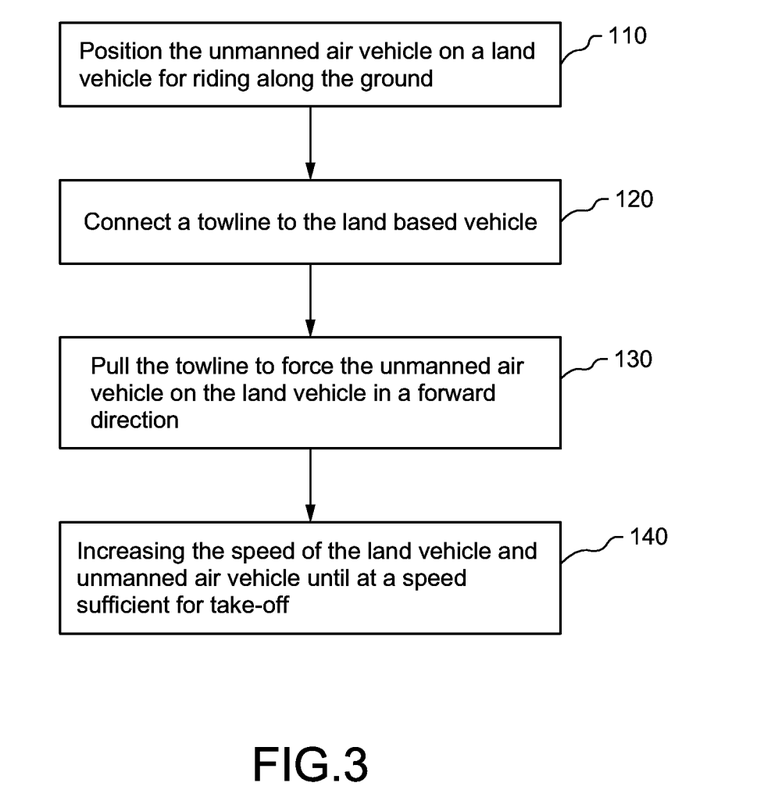
FIG. 3 is a flow chart showing the steps of the method according to the present disclosure for launching an unmanned air vehicle.

A method according to the present disclosure comprises at step 110 placing the unmanned aerial vehicle on a surface vehicle such as the dolly cart 50. A tow line is attached to the surface vehicle at step 120, and the tow line is pulled at step 130 to move the surface vehicle with unmanned air vehicle resting thereon along the ground. The speed of pulling the tow line is increased until the unmanned air vehicle reaches or exceeds its take-off speed, as shown at step 140. When the unmanned aerial vehicle reaches its take-off speed the unmanned air vehicle may naturally lift from the surface vehicle. Alternatively, greater control is achieved if the unmanned air vehicle is actively launched by adjusting the position of lift surfaces of the unmanned air vehicle. For example, trailing edge flaps may be rotated to increase the lift causing the unmanned air vehicle to lift-off from the surface vehicle. Adjustment of the lift surfaces to initiate launch in this way allows the timing of launch to be controlled.

The dolly cart 50 shown in FIG. 2 is specially adapted for the purpose of launching an unmanned air vehicle. The dolly cart 50 is based on a trolley having wheels 54. The dolly cart may be considered to be a land based vehicle. The dolly cart or land based vehicle may travel over a flat surface during UAV launch, such as a semi-prepared surface or asphalt. Other surfaces may be compatible with the other types of surface vehicle depending on parameters of the vehicle such as wheel size, ski size, or air cushion parameters (for example, size and capacity), along with speed required.

Figure 5:
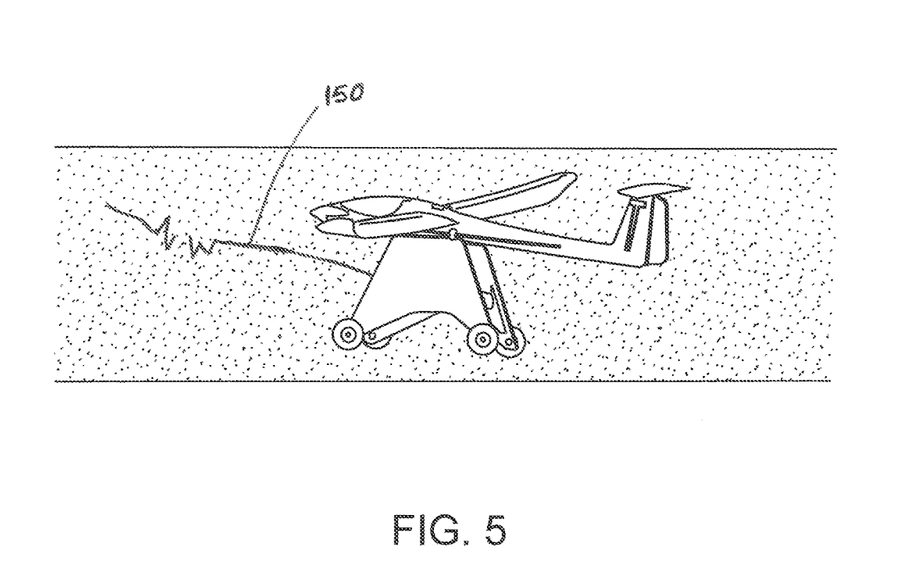
FIG. 5 illustrates the land based vehicle of FIGS. 2 and 4 at the moment of take-off of an unmanned air vehicle.

The dolly cart shown in FIG. 2 is an example configuration of a land based vehicle for the present disclosure, but other configurations may be used. The dolly cart of FIG. 2 comprises sidewalls 51 and base 55 which make up the general shape of the cart. The wheels are coupled to the side walls, with two at the bottom of each sidewall 51. The wheels are coupled to the side walls with an axle passing through each side wall. Separate axles are used for each wheel. Other configurations for the wheels are possible. In the configuration shown, the base 55 spaces the sidewalls 51 apart. At the top of the sidewalls 51 are wing supports 53. The wings supports are slightly wider than the thickness of the sidewalls. The width provides platforms on which the wings are supported and rest. The fuselage of the air vehicle sits generally between and/or above the side walls. Wing retainers 56 are protrusions or brackets extending upwards from the platforms of the wing supports. The wing retainers 56 keep the unmanned air vehicle on the cart during forward motion of the cart, and particularly as the motion of the cart commences or if the cart travels over uneven ground. The wing retainers 56 are located towards the rear of the wing supports 53 such that they sit behind the wing. In this configuration FIG. 2 is a rear view of the cart. FIG. 5, which is discussed below, shows the dolly cart with the unmanned air vehicle resting on top of the dolly cart. The angle of attack of the unmanned air vehicle is set by the angle of the wing supports 53.

The cart 50 may also comprise shaped front and rear fuselage supports 52 for accommodating an unmanned air vehicle having a different shape, for example a different planform, wing, or fuselage dimension. In this alternative configuration the fuselage of the unmanned air vehicle sits between the sidewalls 51. The front and rear fuselage supports 52 are at either ends of the cart. In this case, the angle of attack of the unmanned air vehicle is set by the relative heights of the shaped fuselage supports 52. In FIG. 2 the cart is shown from the rear. Thus, the support 52 shown in FIG. 2 is the rear support.

The tow line may be wire, nylon line or braided wire for example. The tow line has a first coupling member at the end of the tow line for coupling to a second coupling member attached to the dolly cart. The tow line may additionally include a resilient section at, or close to, its end adjacent to the coupling member. The resilient section may include bungee rubber or other elastic line.

The first and second coupling members may include a buckle, karabiner or snap to allow simple and fast coupling of the towline to the dolly cart. An advantage of the embodiments disclosed herein compared to self-propelled take-off is that the energy source of the unmanned air vehicle is conserved during take-off. Conventionally unmanned air vehicles are powered by battery or other energy source in which the amount of available energy is limited. Take-off is possibly the phase of flight having the highest energy usage. Hence, any arrangement in which at least some energy is conserved during take-off may either save weight or extend the flying time before the energy source on-board the unmanned air vehicle is exhausted. Furthermore, much of the prior art couples the tow line directly to the air vehicle. In the embodiments of the present disclosure the tow-line 150 is coupled to the cart. This allows towing loads to be transmitted to the cart instead of directly to the air vehicle. The region of coupling to the tow line may require reinforcement, but this is not necessary if the tow line is instead coupled to the cart or trolley. The use of a cart also removes the requirement for the unmanned air vehicle to have landing gear or an undercarriage. At landing an undercarriage is desirable but not necessary because unmanned air vehicles may land by parachute, or may incorporate skids or skis for landing.

Another advantage of the method in which the UAV is placed on a land based vehicle and towed by a towline to launch speed is that stable and repeatable launch conditions are provided. Some UAVs are provided with tandem-wheel landing gear. This means they are inherently unstable when stationary or at low speed. Hence, for such UAVs it is conventionally preferred to have an operator keeping the UAV upright and the wings horizontal during launch. The use of a land based vehicle or surface vehicle and method of launch according to the present disclosure eliminates the need for an operator to steady the position of the UAV and provides repeatability in aircraft position prior to launch.

FIG. 5 shows the dolly cart 50 with unmanned air vehicle positioned on top of the cart. The unmanned air vehicle is positioned with the wings supported by wing supports 53 and the fuselage positioned between the sidewalls 51. In FIG. 5 the unmanned air vehicle has just left the cart 50.

Figure 7:
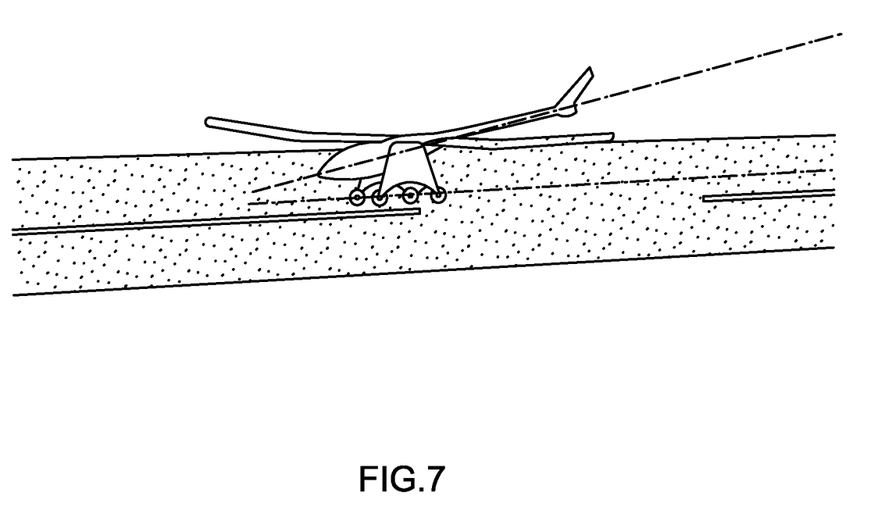
FIG. 7 illustrates the land based vehicle of FIGS. 2 and 4 carrying an unmanned air vehicle in a nose-down position.

In FIG. 7, a different unmanned air vehicle is used with the dolly cart 50. In this FIG. the unmanned air vehicle can be seen with significant nose-down attitude.

We now describe in more detail the method and device shown in FIGS. 4-8. The system comprises a towline, a winch towing system for winding the towline to pull the land based vehicle or dolly cart along the ground, and the land based vehicle or dolly cart. The towline and winch are not shown in the figures. Optionally, the towline may include a tension buffer in the form of a bungee close to the dolly. The dolly cart, land based vehicle or surface vehicle may be specifically designed for the UAV it is intended to launch. The launch vehicle may be specifically designed for launching a plurality of different types or models of UAV having different shapes or sizes of fuselage or planform. As shown in FIG. 7 the wings of the UAV may rest on the land based vehicle such that the UAV is held with the nose of the UAV oriented at a down angle. The down angle is may be within approximately 10 to 20 degrees, such as 15 degrees, below the horizontal. The nose down attitude allows the UAV to be towed to speeds well in excess of the stall speed without the UAV departing the land based vehicle or cart. The overspeed provides immediate altitude gain as soon as lift surfaces on the UAV are rotated, with no power input provided from the UAV towards lift. This arrangement permits controlled release or launch of the UAV from the launch vehicle. Another advantage of the nose down attitude and controlled release is that for some UAVs, such as those driven in flight by one or more pusher-propellers mounted towards the rear of the UAV or its wings, is that the immediate altitude gain prevents the propeller from hitting the launch vehicle during take-off as might happen conventionally, especially if the take-off sequence deviates from stringent parameters.

Figure 4A:
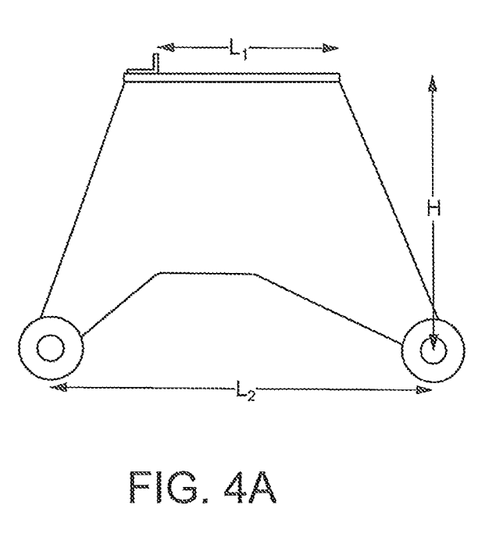
FIGS. 4a and 4b are, respectively, side and front views of the land based vehicle of FIG. 2.
Figure 4B:
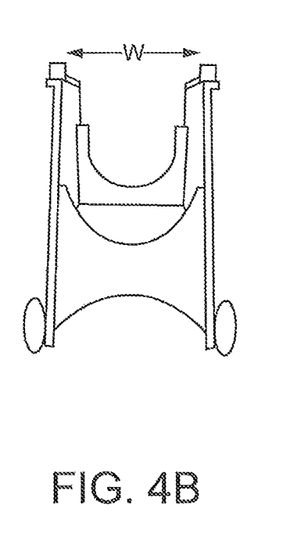
Figure 6A:
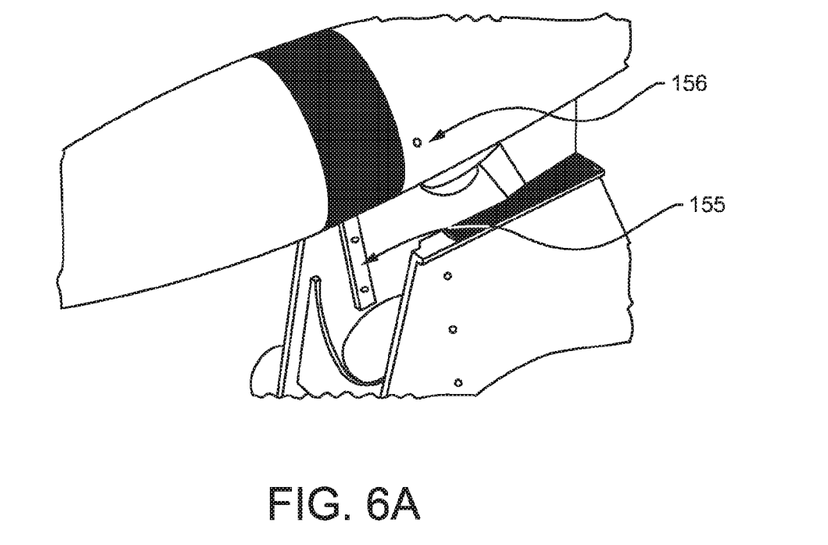
FIGS. 6a and 6b illustrate implementation of guides on a UAV and slides on the dolly cart according to an embodiment of the present disclosure.
Figure 6B:
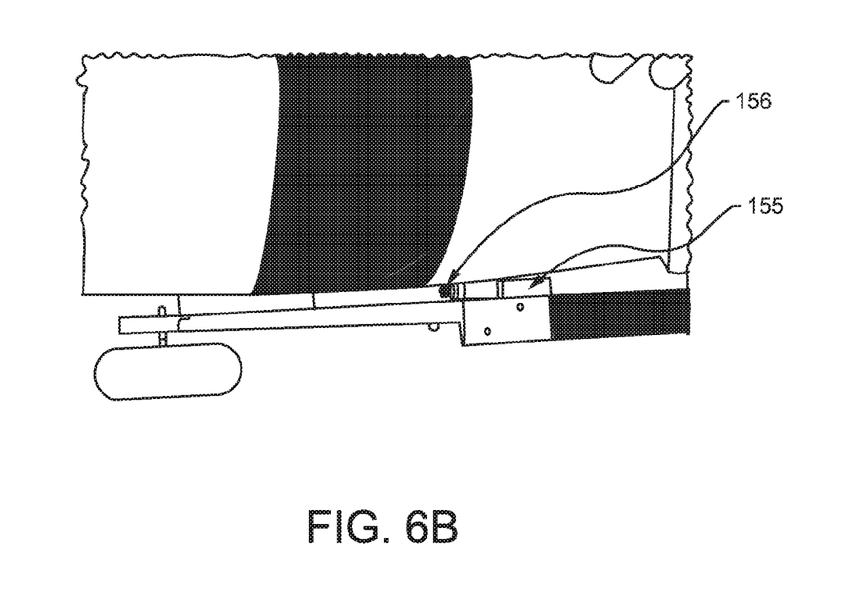

Side and rear views of the dolly cart 50 are shown in FIG. 4. The dolly cart 50 may be constructed of wood or other materials. The exemplary embodiment shown in FIGS. 5, 6 and 7 is constructed of 10 mm thick plywood sheets. 2 mm thick plywood reinforcements are applied at the wheel attachment areas. By not increasing the thickness throughout the weight of the trolley is reduced. The wheels are 89 mm hollow wheels with 5 mm hubs. Polyurethane foam was applied at wing supports 53 to cushion the wing so as to avoid wing surface damage and increase grip to the UAV.

The dolly cart example shown in FIG. 4 has dimensions as follows. Other dimensions are of course possible. The cart has a wheelbase length L2, that is the distance between the axles of the front and rear wheels of 570 mm. The height H of the cart from the axis of the front wheels to the top surface of the wing support 53 is 430 mm. The height from the axis of the rear wheels to the top surface of the wing support 53 may be greater than the height H (whatever the actual value of H) in order to achieve a nose-down attitude for the UAV. The distance W between the inner surfaces of the sidewalls 51 is 225 mm, but may be sized appropriately to receive the fuselage of the desired UAV. The wings supports 53 may have a planar surface on which the wing of the UAV may rest. The size of the wing support may be similar to that of the leading edge to trailing edge distance (also known as chord length) for the part of the wing of the UAV that would rest on the support. In the example of FIG. 4, the surface of the wing support has a length L2 of 300 mm.

The geometry of the launch vehicle may allow for the fuselage of the UAV to fit between the sidewalls 51. Indeed the main limitation in terms of interoperability with multiple types or models of UAV is whether they will fit between the sidewalls. As mentioned above the UAV may be held at a nose down attitude. In one embodiment this is achieved by the top surface of the wings supports having a negative slope, as shown in FIG. 7. The negative slope results in negative lift which keeps the plane on top of the cart. Depending on the amount of negative lift needed and the speeds of the UAV involved the nose down position may be an angle between 5 and 20 degrees, or between 10 and 20 degrees, such as 15 degrees. In another embodiment the fuselage supports 52 at the front and rear of the cart have different heights. The fuselage supports 52 may be shaped to match the cross-section of the UAV for when the UAV is of the type in which the fuselage is mostly or completely between the sidewalls. The height of the top of the front fuselage support is lower than that of the rear fuselage support to provide the nose down angle.

As mentioned above, the land based vehicle may include retainers 56 to prevent the UAV from becoming unstable on or from dropping from the rear of the cart such as during initial towline tension and the subsequent pulling of the towline to bring the cart up to speed. Two kinds of retainers have been considered. As shown in FIG. 5, wing trailing edge retainers installed towards the rear of the dolly can be used. These consist of a bracket or other sharply raised projection upwards from the wing support against which the trailing edge of the wing contacts. This type of retainer has the advantage that it can be used for any type of UAV. However, it can result in damage to the wing trailing edge or provide additional loads to the flaps of the wing. A second kind of retainer has also been considered, as shown in FIGS. 6a and 6b. This requires modification to the fuselage of the UAV so as to include guides 156 which in the embodiment of FIG. 6 are cylindrical protrusions with semi-spherical tips extending from the sides of the fuselage. The guides may extend from the widest part of the fuselage or extend to form the widest part of the fuselage. In the embodiment shown the protrusions are approximately 30 mm in length. Other shapes and size of guides are possible. The guides 156 interfere with slides 155 on the inner sidewalls of the cart. The slides 155 are ridges mounted vertically to the inner surface of the sidewalls 51 of the cart. The slides may alternatively be channels. The slides do not need to be mounted vertically. Their direction and orientation will determine the direction taken by the UAV as it leaves the cart. The slides may be mounted close to the vertical to guide the UAV clear of the cart. In this arrangement the UAV is placed on the cart with the fuselage between the sidewalls 51 of the cart. The UAV is positioned such that the guides are forward of the slides but in contact with the slides, as shown in FIG. 6. The guides 156 in contact with the slides 155 prevent the UAV from moving backwards with respect to the cart such that the UAV is prevented from falling off the back of the cart such as due to the initial towline tension or acceleration of the UAV and cart as the winch pulls the towline.

In certain embodiments the towline is wound around the drum of the winch. The winch used in the exemplary embodiments comprises an electric motor. The electric motor is 1.1 kW and has ball-needle bearings. The winch drum is 250 mm wide and 55 mm in diameter. The winch has reverse-action stopping and a foot operated switch for control. In an alternative arrangement, the manual foot operated switch is replaced by an automatic tension control system which includes a microprocessor to adjust the winch winding rate to control the tension in the towline and the speed and acceleration of the UAV and launch vehicle. The tension in the towline may be measured using optical fibre strain gauges incorporated into, or attached to, the towline. Automatic control would allow the optimum tension and cart speed to be applied merely by proving the UAV's type, weight and/or configuration without further user intervention, assuming factors such as wind speed can be supplied from a weather station automatically. The winch may be from a radio control glider system such as an F3B system. The winch may be powered by a 12V, 60 A car battery. The total power system weight is just less than 40 Kg.

The winch drum is sized to be capable of accepting different towline lengths and materials. For example, the towline may be 2 mm thickness nylon braided wire. 200 m was wound on to the winch drum. In a first arrangement the winch system is located distal to the UAV and cart such as at the opposite end of the runway. In a second arrangement a turnaround pulley was used which was located distal to the UAV and cart. This allows the winch to be located and controlled at a position close to the starting position of the cart and UAV before launch commences. The towline passes from the winch, down the runway to the turnaround pulley, and back up the runway to the cart. In operation the towline is wound in pulling the cart towards the turnaround pulley.

Different speeds of pulling the towline can be achieved by changing winch drum diameter. A convenient way of adjusting the winch drum diameter is to use cylindrical polyethylene tube sleeves over center of the drum. By adjusting the towline speed different take-off speeds and accelerations can be achieved for the UAV. This is advantageous in that UAVs with different launch speeds or different take-off weights of the same UAV can be used with minimal change to the launch system.

The towline may comprise a tension buffer at the end of the towline proximal to the land based vehicle. The tension buffer may be connected to the rest of the towline and/or the land based vehicle by means of buckles, karabiners and/or snaps that allow quick dismantling of the system. The tension buffer used comprised a bundle of four bungee tubes. Each tube has an outer diameter of 8 mm, an internal diameter of 5 mm, and a length of around 10 m. The bungee tubes are made of surgical NBR rubber. Other sizes, numbers and materials of tension buffer may be used. By connecting the tension buffer part of the towline to the rest of the towline using a releasable connection such as the buckle, karabiner or snaps, as discussed above, this avoids the tension buffer dragging on the ground during disassembly of the system after launch. For example, rewinding of the towline including tension buffer after launch and disconnection of the towline from the cart would result in the tension buffer dragging along the ground. Hence, the use of such releasable connections can result in longer system life.

In a further embodiment, a remote release between the towline and land based vehicle may be included. Such a remote release would allow the land based vehicle to be decoupled from the towline at, or immediately before, the moment of take-off. This release converts to an additional altitude gain for the UAV. Nevertheless, such remote release adds cost and complexity.

Figure 8:
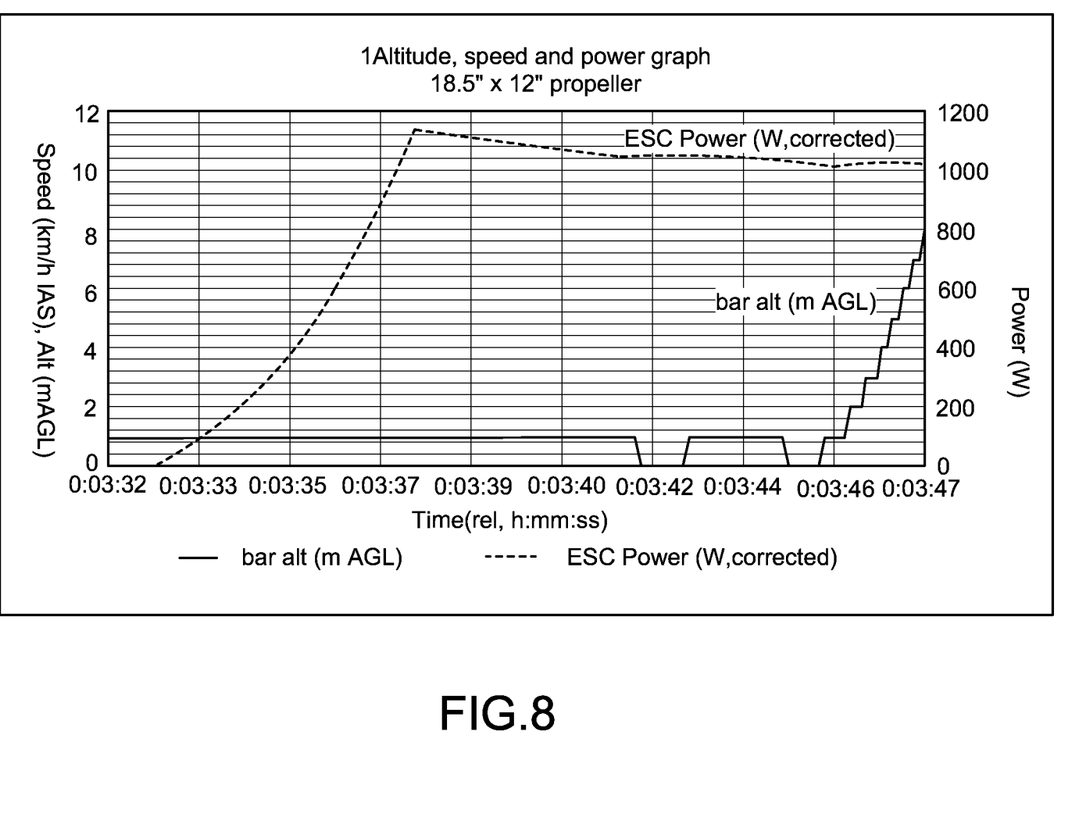
FIG. 8 is a graph showing power drawn and altitude gain of a UAV launched conventionally under its own power.

FIG. 8 is a graph showing energy consumption and altitude for a conventional UAV take-off which is self-powered. The abscissa represents time elapsed. The left hand ordinate axis represents the altitude of the UAV in meters above ground level (AGL). The right hand ordinate axis represents the power drawn by the UAV from its internal energy source, such as batteries. The graph indicates that 3.5 Wh of energy is consumed by the UAV in reaching 5 m above ground level. This compares with the method of the present disclosure in which the UAV shown in FIG. 7 achieved a 4$m$ altitude by energy supplied by towing the land based vehicle. It will still be necessary to power the UAV's propeller or other drive system to some extent during or soon after launch so as to ensure that once take-off has been achieved, the UAVs forward motion and lift is maintained. The UAV's propeller should be switched on as soon as it clears the structure of the surface vehicle after the lift-off. Some take-off procedures may require a slight delay due to, for example, the needed to stabilize the UAV after lift-off. However, the delay should not be substantial, because the UAV will begin to lose speed after lift-off. The amount of power needed from the UAVs own internal power source at the point after lift-off will depend on the UAV and on the desired climb path. The power required is now likely to be the similar to a conventionally launched UAV. Nevertheless, the energy required to accelerate the UAV from rest and launch it to an initial height has not been consumed from the internal energy source of the UAV thereby extending the lifetime of the energy source.

The person skilled in the art will readily appreciate that various modifications and alterations may be made to the above described method and apparatus without departing from the scope of the appended claims. For example, different shapes and dimensions of UAV, cart or winch may be used.

What is claimed is:

1. A method of launching an unmanned air vehicle, comprising:

supporting the unmanned air vehicle on a surface vehicle, the surface vehicle adapted to travel on a ground surface, the surface vehicle supporting the unmanned air vehicle in a nose down position wherein a nose of the unmanned air vehicle is oriented downwardly with respect to the ground surface;

connecting a towline to the surface vehicle;

pulling the towline to force the unmanned air vehicle in a forward direction at a speed sufficient for take-off, wherein the nose down position of the unmanned air vehicle has sufficient incline to produce a negative angle of attack to provide a negative lift at lift surfaces of the unmanned air vehicle as the unmanned air vehicle moves in the forward direction, and wherein the surface vehicle is configured to prevent rearward movement of the unmanned air vehicle relative to the surface vehicle while permitting the unmanned air vehicle to move relative to the surface vehicle in at least one non-rearward direction; and after the unmanned air vehicle has reached the speed sufficient for take-off, adjusting lift surfaces of the unmanned air vehicle to counteract the negative lift and launch the unmanned air vehicle from the surface vehicle.

2. The method of claim 1, in which at least a part of the towline is resilient to reduce an impact of initial towline tension.

3. The method of claim 1, in which the surface vehicle comprises a dolly cart having surface-engaging members.

4. The method of claim 1, in which the unmanned air vehicle is retained on the surface vehicle during initial towline tension impact by retainers on the surface vehicle arranged to contact trailing edges of the wings of the unmanned air vehicle and prevent rearward movement of the unmanned air vehicle relative to the surface vehicle.

5. The method of claim 1, in which the unmanned air vehicle is supported on the surface vehicle by wings of the unmanned air vehicle resting on side walls of the surface vehicle.

6. The method of claim 1, in which supporting the unmanned air vehicle comprises supporting a fuselage of the unmanned air vehicle between two sidewalls of the surface vehicle.

7. The method of claim 6, in which the sidewalls comprise vertical slides and the unmanned air vehicle comprises a pair of laterally opposed guides at sides of the fuselage, the slides obstructing rearward motion of the guides relative to the surface vehicle.

8. The method of claim 1, in which pulling the towline comprises driving a winch to pull the towline.

9. The method of claim 1, further comprising operating a propulsion apparatus of the unmanned air vehicle after take-off from the surface vehicle.

10. The method of claim 1, wherein at least a pair of retainers are provided on the surface vehicle, each retainer being positioned rearwardly of an associated contact point on the unmanned air vehicle and configured to prevent rearward movement of the unmanned air vehicle relative to the surface vehicle while permitting the unmanned air vehicle to move relative to the surface vehicle in the at least one non-rearward direction.

11. The method of claim 10, in which each of the retainers comprises a wing retainer projecting upwardly from an associated side wall of the surface vehicle and configured to engage a rear surface of an associated lift surface.

12. The method of claim 10, in which each of the retainers comprises a slide coupled to an associated sidewall of the surface vehicle, wherein the unmanned air vehicle includes a pair of guides projecting from a fuselage of the unmanned air vehicle, each guide being sized to engage an associated slide.

13. The method of claim 12, in which each slide is oriented substantially vertically to permit vertical movement of the unmanned air vehicle relative to the surface vehicle.

14. Apparatus for launching an unmanned air vehicle, comprising:

a towline;

a surface vehicle including surface riding units for traveling over a ground surface, the surface vehicle configured to releasably support the unmanned air vehicle in a nose down position wherein a nose of the unmanned air vehicle is oriented downwardly with respect to the ground surface, the surface vehicle having a coupling for connecting the towline to the surface vehicle;

a drive for pulling the towline, thereby to advance the surface vehicle in a forward direction;

wherein the unmanned air vehicle in the nose down position has an incline sufficient to produce a negative angle of attack to provide a negative lift at lift surfaces of the unmanned air vehicle as the unmanned air vehicle moves in the forward direction at a speed sufficient for take-off; and wherein at least a pair of retainers are provided on the surface vehicle, each retainer being positioned rearwardly of an associated contact point on the unmanned air vehicle and configured to prevent rearward movement of the unmanned air vehicle relative to the surface vehicle while permitting the unmanned air vehicle to move relative to the surface vehicle in at least one non-rearward direction.

15. The apparatus of claim 14, in which the surface vehicle further comprises supports arranged to support the unmanned air vehicle in the nose down position as the surface vehicle travels on the ground surface.

16. The apparatus of claim 14, in which the surface vehicle comprises a dolly cart.

17. The apparatus of claim 14, in which the drive comprises a winch.

18. The apparatus of claim 14, in which each of the retainers comprises a wing retainer projecting upwardly from an associated side wall of the surface vehicle and configured to engage a rear surface of an associated lift surface.

19. The apparatus of claim 14, in which each of the retainers comprises a slide coupled to an associated sidewall of the surface vehicle, wherein the unmanned air vehicle includes a pair of guides projecting from a fuselage of the unmanned air vehicle, each guide being sized to engage an associated slide.

20. The apparatus of claim 19, in which each slide is oriented substantially vertically to permit vertical movement of the unmanned air vehicle relative to the surface vehicle.

* * * * *